United States Patent
Østergaard

(10) Patent No.: US 6,237,964 B1
(45) Date of Patent: May 29, 2001

(54) SOCKET PIPE COUPLING FOR SUBSEA PIPELINE SYSTEMS

(75) Inventor: Inge Østergaard, Heggedal (NO)

(73) Assignee: ABB Offshore Technology AS, Billingstad (NO)

( * ) Notice: Subject to any disclaimer, the term of this patent is extended or adjusted under 35 U.S.C. 154(b) by 0 days.

(21) Appl. No.: 09/091,217

(22) PCT Filed: Dec. 20, 1996

(86) PCT No.: PCT/NO96/00297

§ 371 Date: Aug. 27, 1998

§ 102(e) Date: Aug. 27, 1998

(87) PCT Pub. No.: WO97/23704

PCT Pub. Date: Jul. 3, 1997

(30) Foreign Application Priority Data

Dec. 22, 1995 (NO) .................................................. 955289

(51) Int. Cl.[7] .................................................. F16L 37/00
(52) U.S. Cl. .............................................. 285/85; 285/310
(58) Field of Search ................................. 285/32, 39, 85, 285/86, 315, 321, 920, 340, 308, 309, 310, 912; 166/344, 345

(56) References Cited

U.S. PATENT DOCUMENTS

| | | | |
|---|---|---|---|
| 2,628,111 | * | 2/1953 | Smalline ............................... 285/310 |
| 4,426,104 | * | 1/1984 | Hazelrigg ......................... 285/310 X |
| 4,441,740 | | 4/1984 | Cowan et al. . |
| 4,708,376 | * | 11/1987 | Jennings et al. .................. 285/920 X |
| 4,893,842 | * | 1/1990 | Brammer ......................... 285/315 X |
| 5,934,709 | * | 8/1999 | Morrison ......................... 285/315 X |
| 6,068,427 | * | 5/2000 | Ostergaard ....................... 166/345 X |

FOREIGN PATENT DOCUMENTS 2 220 115  1/1973 (DE) .
2 104 170  3/1983 (GB) .

OTHER PUBLICATIONS

Shigley et al, Mechanical Engineering Design, 4th ed., New York, McGraw–Hill, p. 590, 1983.*

* cited by examiner

*Primary Examiner*—Lynne H. Browne
*Assistant Examiner*—Greg Binda
(74) *Attorney, Agent, or Firm*—Nixon & Vanderhye

(57) ABSTRACT

A socket pipe joint includes a male part and a female part in telescopic overlapping position in the joint. An interlocking sleeve member is provided between the male and female parts. Locking elements including the interlocking sleeve member are provided to releasably lock the male part and female part to one another. A locking sleeve is positioned on the male part and extends from a position inside the female part to a position outside an end opening of the female part. A drive assembly is coupled to the locking sleeve on the outside of the joint and is operable to displace the locking sleeve axially between inner and outer positions. A positioning and interlocking element includes a pawl. By axial displacement of the locking sleeve, the pawl is displaced radially, positioning and interlocking the two pipe parts with simultaneous permanent compression of a seal between the pipe parts.

14 Claims, 6 Drawing Sheets

SOCKET PIPE COUPLING FOR SUBSEA PIPELINE SYSTEMS

TECHNICAL FIELD

Figure 1:
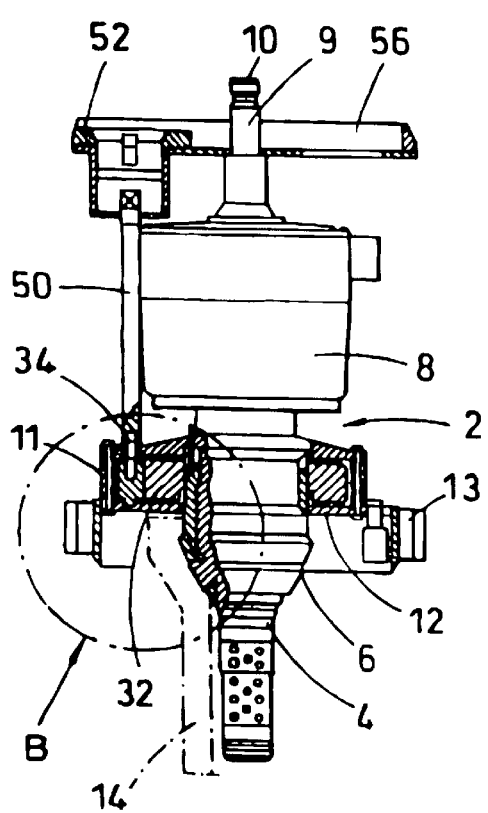

The present invention relates in general to socket pipe couplings with a female part and a male part telescopically engaged in a coupling position. The invention is especially developed for intercoupling pipe line parts in subsea installations, but can also be utilized for other applications.

The invention relates especially to socket pipe couplings of the kind wherein is used one or more displaceable sleeves in the joint by radial movement of usually wedge-shaped clamping members, effecting that the two pipe sections are being pressed together to a locked position with a simultaneous compression of interposed seal member or members.

BACKGROUND OF THE INVENTION

There are known a plurality of socket joints of this type. As illustrative for the prior art one may refer to U.S. Pat. No. 4,652,021, GB 2004341, SE 342495, FR 919287, GB 2223072 and U.S. Pat. No. 4,696,493. The two latter US patents are showing solutions wherein are utilized two overlapping displaceable locking rings on the inside of the joint, which can provide an outwardly directed pressing of wedge-shaped locking pawls with a simultaneously compressing of interposed seal elements. The coupling itself is carried out with a rotating tool which is engaged with the internal locking sleeve. A drawback of the before mentioned solutions is that the operation of the joints depends on a rotary tool which must be positioned inside one of the pipe parts, and necessitates that one of the pipe ends is open. A further drawback is that the packing or seals are positioned on the outside of the joint and therefore are susceptible to influence from outside environments, for instance ambient sea water, simultaneously as packings or seals will be exposed to the media inside the pipes.

SUMMARY OF THE INVENTION

The main object of the present invention has been to arrive at a simpler and more rugged construction, which simultaneously results in a high pressure resistant intercoupling and sealing between the respective pipe lines and also long durability. A further object of the invention is to provide a quick connect/disconnect coupling, i.e. a coupling with a mechanism which in a simple and quick fashion can be coupled and released, preferably by means of a rotating tool which is positioned on the coupling parts on the outside of the joints.

The socket pipe coupling in accordance with the invention is thus of the kind comprising a male part and a female part in an overlapping position in the joint, and wherein the coupling includes one or more displaceable sleeves which, subject to pressure against adjacent preferably wedge-shaped locking elements which thereby being pressed outwardly, can provide interlocking of the pipe parts, simultaneously as the interposed packing elements are subject to a compression, and the invention is characterized in that on the male part in the coupling is positioned a locking sleeve which extends outside of the end opening of the female part, and to manoeuvering means fixedly mounted on the male part for displacement of the sleeve between an inner position and an outer position, the sleeve in the inner position pressing against the locking elements providing compression of an interposed seal member and interlocking of the pipe parts.

In a preferred embodiment for the invention the locking sleeve on the male part outside the female part is provided with external threads in engagement with an adjacent mounted gear drive which may be operated by means of an auxilliary power tool.

The solution in accordance with the invention facilitates use of one single, preferably wedge-shaped seal ring made of metal or steel and which is positioned in a seat on the inside of the joint between the outside or the inside of the male part, and an adjacent seat surface at the bottom of the female socket.

The wedge-shaped locking elements may consist of a number of circumferentially distributed, radially movable locking pawls or dogs having wedge faces in position between the male and the female part in the joint, respectively, or in the shape of a radially flexible ring, a so called split ring (with a transverse slit)—and which by means of the locking sleeve may be pressed outwardly from a retracted resting position to an outer position for engagement between the male part and the female part, and thereby effect interlocking of the pipe parts in the joint and compression of an interposed seal member.

BRIEF DESCRIPTION OF THE DRAWING FIGURES

Figure 2:
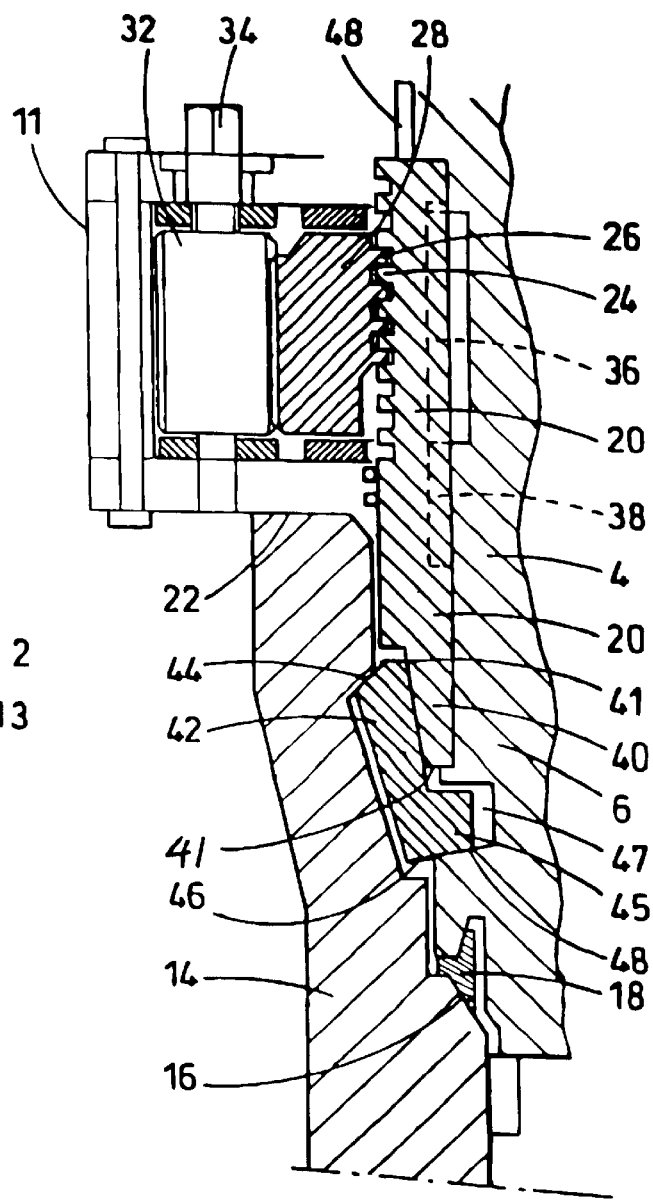
Figure 3:
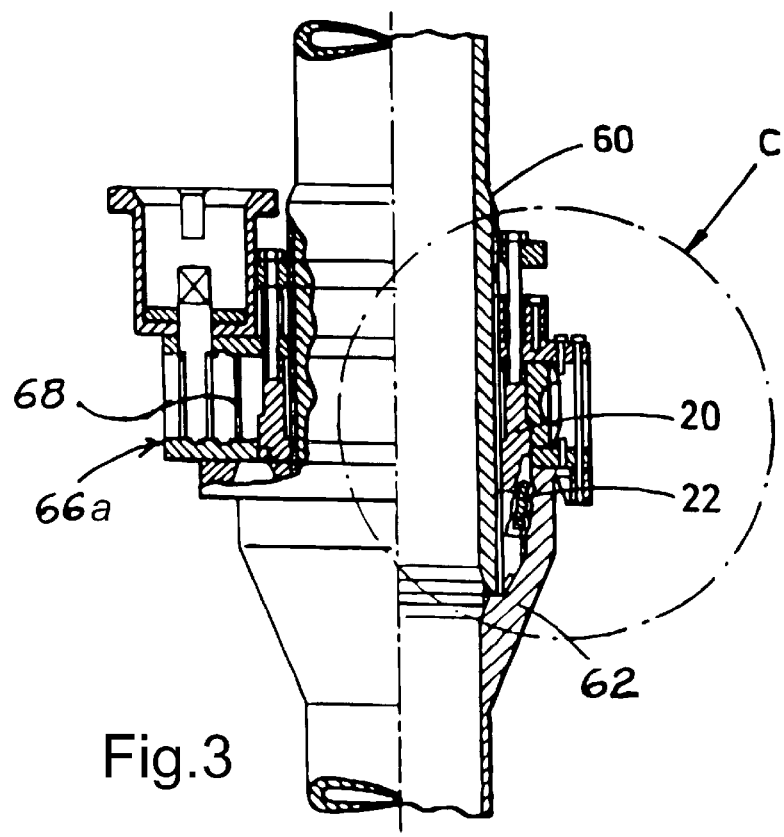
Figure 4:
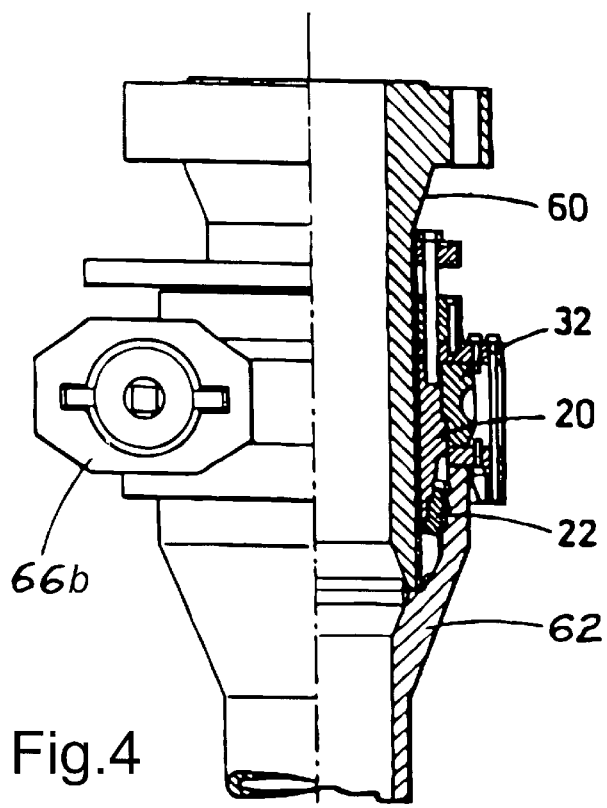
Figures 5, 6:
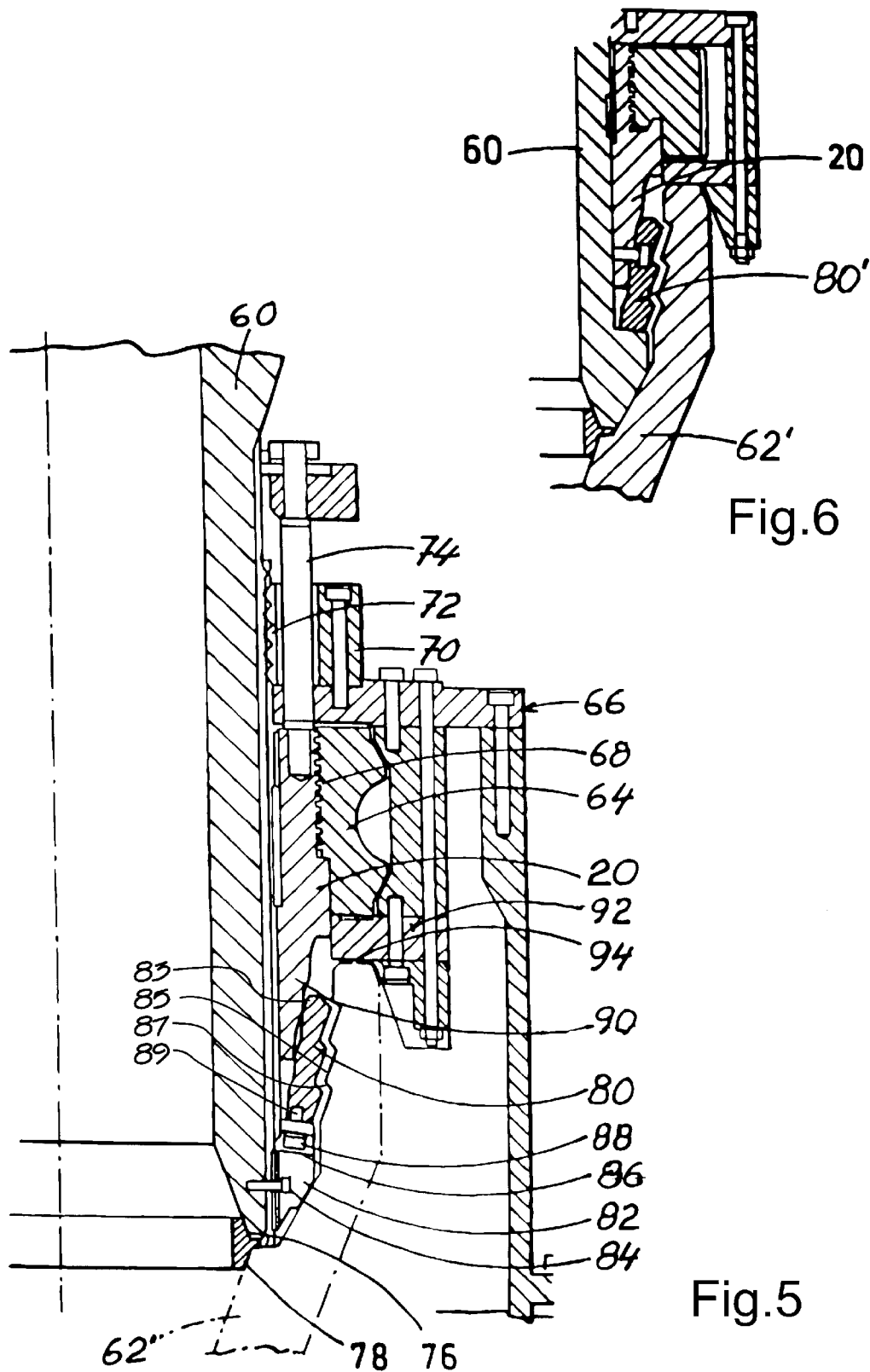
Figure 7:
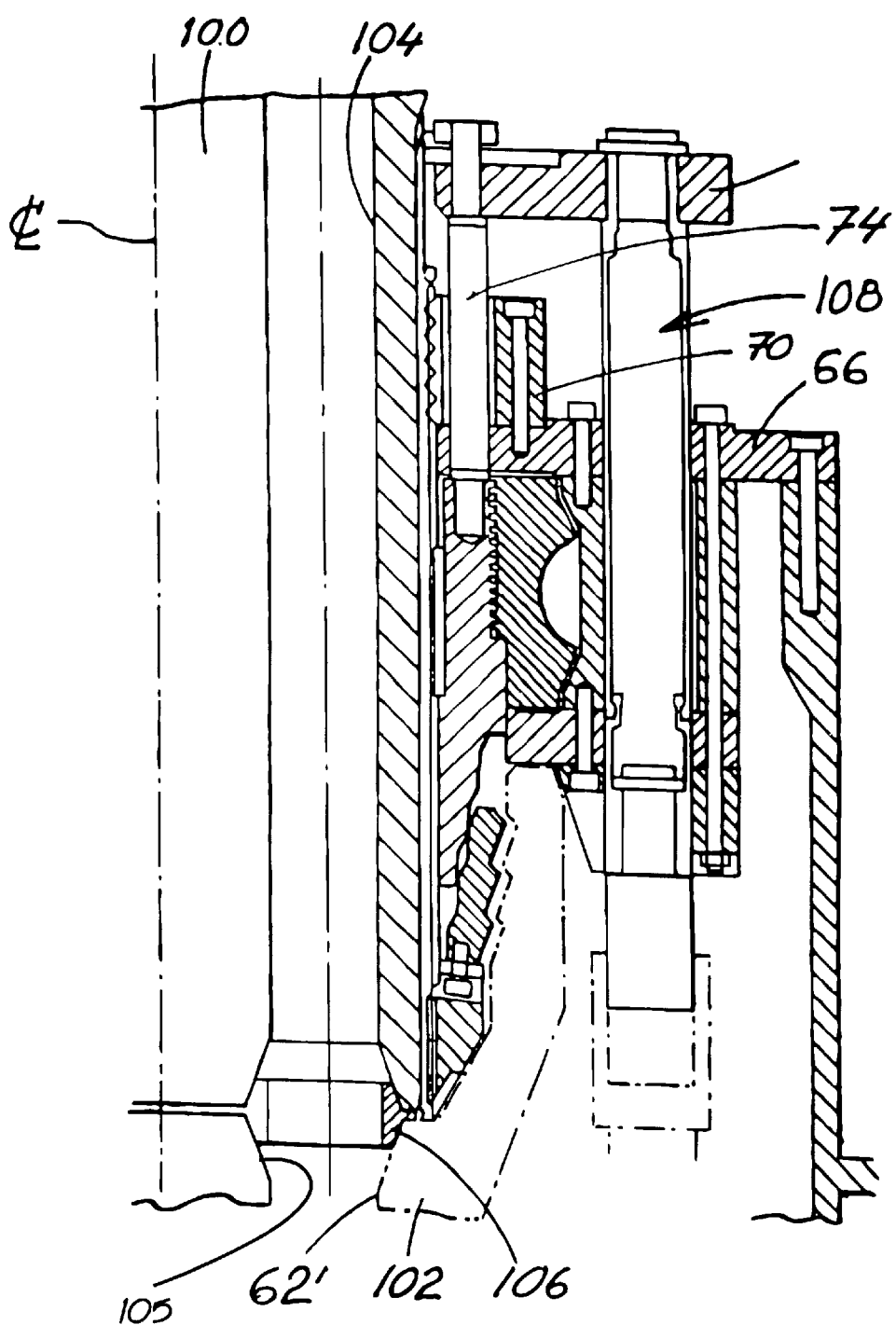
Figure 8E:
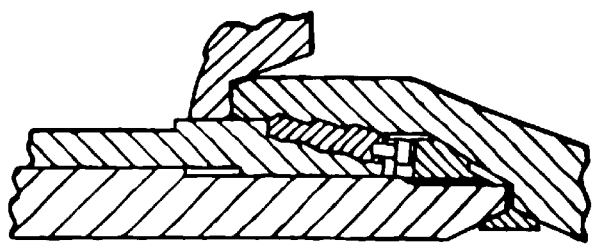
Figure 8D:
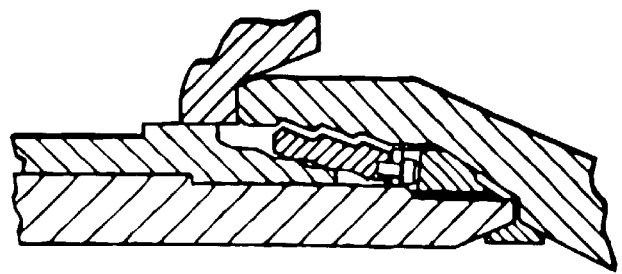
Figure 8C:
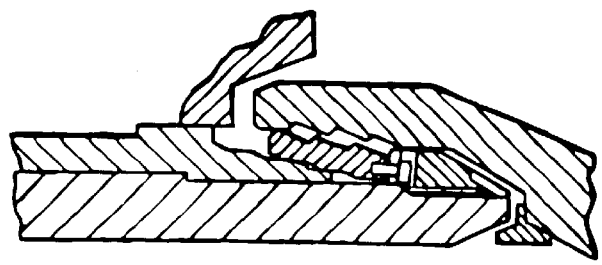
Figure 8B:
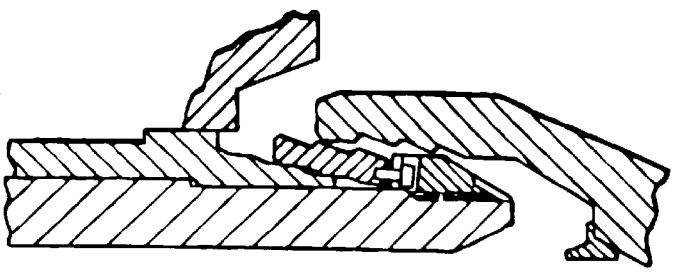
Figure 8A:
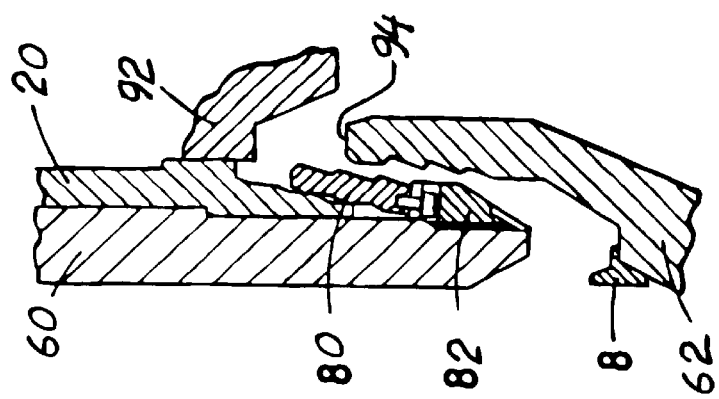
Figure 9:
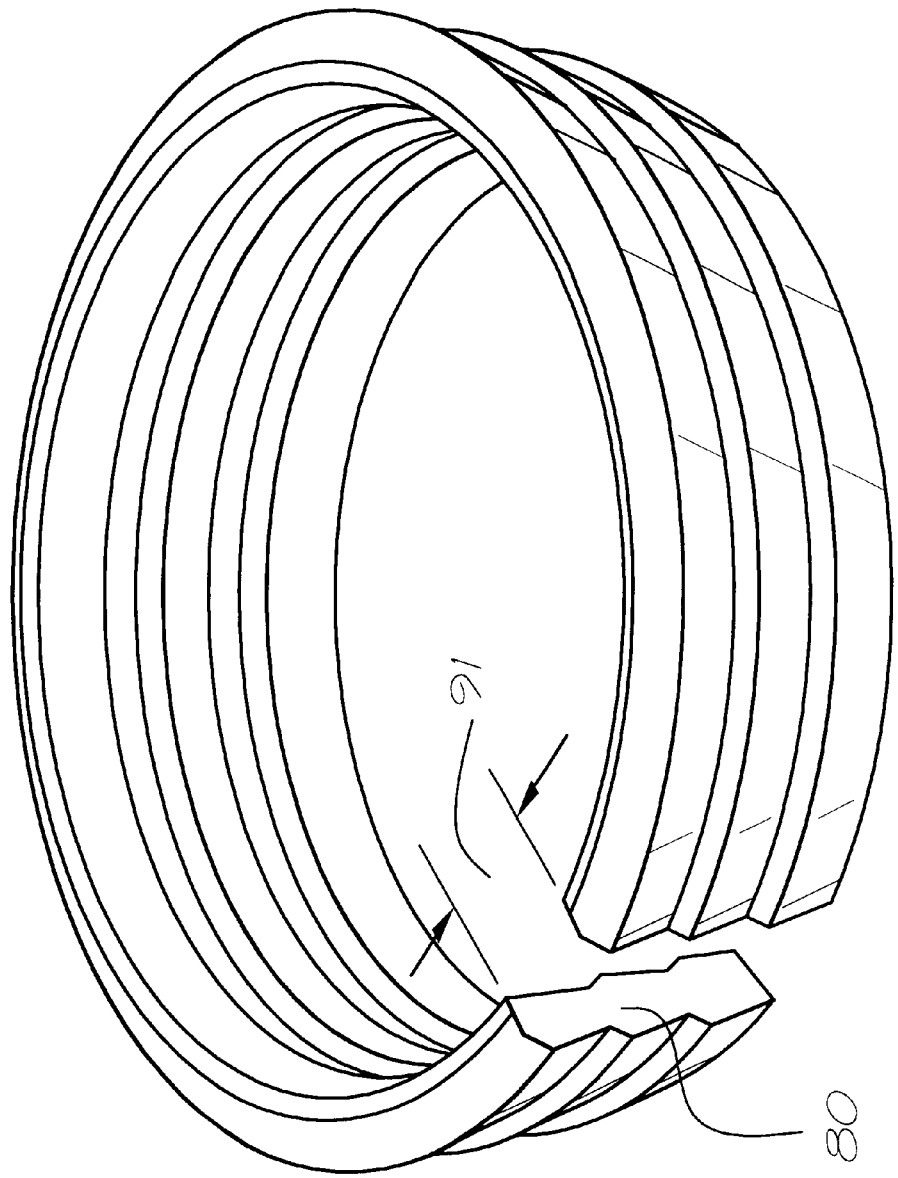

Other features and advantages of the invention will appear from the following specification with reference to the enclosed drawings, which are showing two different applications for the invention, namely a first application wherein the joint is utilized for fastening and coupling of a valve insert in a valve housing, and a second application which relates to the coupling of a well head pipe to a riser pipe for a sea bottom installation, wherein FIG. 1 shows a valve insert for a choke valve of in per se known type, provided with a coupling means in accordance with the invention, FIG. 2 shows a detail section in a large scale of a part of the valve shown in FIG. 1 which is circumscribed with the circle B in FIG. 1, FIG. 3 is a sectional lateral view of a pipe joint of the socket type in accordance with the invention wherein the part to the left of the center line shows the driving means, partly in section, while the part right of the center line shows the coupling in intercoupled position, FIG. 4 is a lateral view of a similar pipe joint of the socket type wherein the drive means for the coupling mechanism is provided with a horizontally or laterally directed coupling box with a drive head and wherein the part to the right of the center line shows a section through the coupling means, FIG. 5 is a detail view in section in an enlarged scale of the part shown inside the circle C shown in FIG. 3, FIG. 6 is a detail view in section showing a special embodiment of the locking pawls, FIG. 7 is view similar to FIG. 5 of an embodiment for an invention wherein the coupling means is utilized for intercoupling two or more parallel pipe lines or pipe jackets, FIGS. 8a–e are five detail views which in section illustrates the movement sequence of the parts during the coupling procedure, FIG. 9 is a perspective view of the split ring member.

DETAILED DESCRIPTION OF THE INVENTION

FIG. 1 shows a valve insert for a vertically mounted choke valve 2, comprising a lower valve stem 4, an intermediate supporting section 6 with valve faces/seats. On the upwardly directed valve stem extension is mounted a box 8 which contains manoeuvering equipment for the valve, including a motor etc. The valve insert is per se known. The valve stem has an extension 9 on the top with a gripper head 10 serving as supporting and lifting member for the valve insert, and which further can be utilized as an emergency operating means.

On the intermediate section 6 of the valve stem is mounted a drive assembly 11 with a bottom plate 12, adapted to be biased against the top face 22 of the valve housing 14, shown in stitched lines. In the shown application for the invention the valve housing 14 constitutes the female part in the coupling, while the valve stem 4 forms the male part. The number 13 designates elements which are utilized for positioning the valve insert on the valve housing, and is of minor interest in connection with the present invention.

The coupling mechanism in accordance with the invention is shown in detail in FIG. 2, which shows a section of the part shown inside the circle B shown in FIG. 1, and wherein the same reference numbers designate the same parts as shown in FIG. 1. Thus, reference number 14 designates the socket shaped valve housing with a seat 16 for the packing or seal ring 18 which as shown preferably consists of a double conical ring of metal or steel.

The intermediate part 6 of the valve stem constitutes as mentioned the male part in the joint. On the part 6 is supported an displaceable locking sleeve 20, the upper part of which is in position outside or above the top face 22 on the valve housing 14 (the female part) and is provided with a threaded section 24 which stands in engagement with inward threads 26 on the circumscribing ring gear 28, which is journalled in the drive assembly, i.e., the gear box 11 on slide bearings at the top and at the bottom. The outside circumference of the ring gear 28 is in engagement with a worm gear or pinion 32, provided with an upwardly pointed fixed shaft top extending out of the gear box 11 with a non-circular coupling tap or dowel 34 or the like for positioning an electric or hydraulic power tool.

The locking sleeve 20 is non-rotatably journalled on the valve stem 4 by means of a longitudinal slit 38 made in the side face of the valve stem, whereby is positioned a splint 36, whereby the locking sleeve 20 can be moved upwards and downwards within defined limits.

The lower part of the locking sleeve 20 is as shown provided with a reduced section 40 which is terminated with a transverse biasing face 41. The section 40 is tapered in direction downwards, and can serve as a wedging face. Adjacent the lower part of the locking sleeve is arranged a plurality of circumferentially distributed pawls or dogs 42, the upper part of which has a tapered or wedge-shaped outwardly directed surface 44 which is contacting a complementary formed biasing face provided on the inside of the valve housing 14. The lower part of the locking pawls 42 have in the shown embodiment a projection 45 which is positioned in a recess 47 in the valve stem 4 and the bottom face 46 of which is biased against the bottom face 48 in the recess 47.

The coupling joint is in FIG. 2 shown in locked position. In this position the locking sleeve 20 has been displaced or driven downwards along the stem whereby the tapered faces 40 presses the dogs 42 outwardly in wedge-shaped engagement with the surface 44, simultaneously as the lower part 45 is guided outwardly along the face 48. The valve stem 4 is thereby simultaneously pressed downwards in the valve housing by means of the locking pawls 42, the top of which will press against the transverse surface 41 on the locking ring, while the bottom face 46 will press against the surface 48 on the valve stem. Thereby the ring seal 18 will be compressed arresting the valve stem movement, simultaneously as the valve stem is locked with wedging effect by means of the locking pawls 42. The locking pawls with the adjacent parts are such dimensionally adjusted that the movement of the locking pawls will be stopped by the seal ring 18 before they have reached the bottom, whereby the seal ring 18 will maintain in compression in locked position.

When the valve insert shall be released from the valve housing, the locking sleeve 20 is moved upwards by means of the gear drive 24, 28, 32 which is put into rotation by means of a power tool engaged with the dowel 34, ending the locking pawls 42 to be displaced radially inwards along the wedged surface 44 simultaneously as they are released from the adjacent part 40 of the sleeve 20, whereby the entire valve insert including the valve stem 6, the locking pawls 42, the locking sleeve 20 and the gear box 11 can be withdrawn upwards out of the valve housing 14 as a unit. The valve can be lowered into the valve insert by gravity. Thereafter the locking sleeve will continue the downward movement.

In FIG. 1 the dowel 34 is arranged with an upwardly directed drive shaft 50, which at the top of the valve insert is coupled to a transfer box 52, mounted on a transverse stayer 56 positioned on the extension 9 of the drive stem. This supplemental device facilitates the access for a coupling tool mounted on a remotely operated vehicle (ROV).

FIGS. 3–7 illustrates a pipe coupling in accordance with the invention for assembling an intercoupling of pipes in subsea position, for instance coupling of a vertical riser pipe on to a production pipe or well head on a bottom based installation.

FIGS. 3 and 4 are lateral views partly in section, illustrating two embodiments of the pipe coupling, wherein FIG. 3 shows an embodiment with vertical coupling drive box 66a, mounted on an upper male part 60, while the embodiment in FIG. 4 shows a solution with laterally directed coupling drive box 66b. In both embodiments the lower pipe section 62 is a female part or socket. Disregarding certain detail differences, the coupling shown in FIGS. 3–7 corresponds to the coupling shown in FIGS. 1 and 2 and the same or corresponding parts are to some extent designated with the same reference numbers in all figures. In FIGS. 3 and 4, the number 62 does designate the socket part in the coupling, while the number 60 designates a vertically positioned pipe or male part which shall be coupled to the socket. The coupling shown in FIG. 3 is shown in detail in FIG. 5, which shows an enlarged section of the part designated with the letter C in FIG. 3. The pipe socket is here shown in stitched lines 62', while pipe 60 is shown in an inserted, but not tightened and locked position. This shall be further described later. In FIG. 5 the ring gear 64 is mounted in the gear box 66 in the same way as shown in FIG. 2 and is engaged via threads 68 to the locking sleeve 20. The gear box 11 is mounted on the pipe 60 via a coupling ring 70 which is pressing against the pipe along recesses/ridges 72. The number 74 designates elements for positioning a combined guiding and locking pin.

The important constructional difference between the pipe coupling shown in FIG. 2 and FIG. 5, respectively, consists in the design of the locking pawls 80. In the embodiment shown in FIG. 5 the locking pawls are, namely, realized as one single closed ring element 80 provided with a transverse slit or slits, one such slit being illustrated at 91 in FIG. 9 (see FIG. 9) such that the ring can flex radially. Similarly as the pawls 42 of the embodiment of FIG. 2, the split ring 80 includes a transverse oblique surface 83 engageable by a tapered surface 90 of the locking sleeve 20 and a wedge surface 85 engagable with a generally complementary surface 87 on the female part 62. The ring is interconnected in a gliding finger joint. This so called split ring 80 is at the bottom preferably furnished with a supporting ring 82 which for instance by means of threads or screws 84 is attached on the lowermost part of the male pipe section. The supporting ring 82 is uppermost provided with throughgoing slits 86 wherein run the heads 88 on threaded bolts 89 which leads through slits in the uppermost part of the ring 82 and are threaded into the bottom part of the split ring 80 as shown. In FIG. 5 the coupling is shown in an intermediate position wherein the male pipe 60 including the entire coupling has been moved down into the female part 62 such that the bottom extremity on the male part is biased against a premounted conical annular seal ring 78 which preferably is made in metal or steel. The split ring 80 is positioned in the spacing between the male part 60 and the female part 62, and has surface contact with a conically tapered part 90 of the locking sleeve 20 simultaneously as the bottom wall plate 92 in the gear box 66 is biased against the top edge 94 of the female part 62 as shown. When the ring gear is activated, the locking sleeve will be driven downwards and presses the flexible split ring 80 radially outwards, simultaneously as the screw bolts 89 are being displaced outwardly in the slits 86.

FIG. 6 is a fragmentary view showing an embodiment of locking pawls 80' which constitutes a combination of the pawl design shown in FIG. 2 and FIG. 5 respectively. Herein are utilized individual, circumferentially distributed locking pawls 80', the outside of said pawls and the inside of the adjacent, complementary female part 62' are provided with a stepwise design as also shown in FIG. 5 in replacement of even wedging faces as shown in FIG. 2 in order to obtain a positive grip between the adjacent parts.

FIG. 7 is a view similar to FIG. 5, wherein the pipe coupling itself is identical to the one in FIG. 5, but wherein the pipe coupling is utilized for simultaneous intercoupling two or more parallel pipe lines in a "bundle" (not shown). The coupling comprises a main tubular pipe module 100 having a center line CL and which is coupled into one single female-part 102 shown in stitched lines. On the right side of the center line CL are in the male pipe module 100 provided tubular bores 104, while in the female part 102 is provided a complementary pipe-shaped passage 105 provided with interpositioned annular seal rings 106. It will be understood that in a such main tubular pipe module 100 can be arranged two or more parallel pipe lines or bores assembled in one single coupling joint 103. On the outside of the gear box 66 are mounted additional conveying means 108 for one or more cables or the like.

FIGS. 8a–e illustrate the sequence in connection with the coupling operation. FIG. 8a shows the position where a male part 60 with all functional parts has been passed down into an intermediate position in a female part 62, wherein the bottom plate 92 has not yet arrived into contact with the top edge 94 on the female part 62. The locking sleeve 20 has been driven up to an upper position, enabling that the split ring 80 to flex inwardly to an inner position, and remaining in contact with the lower conical part of the locking sleeve 20. In that position of sleeve 20, the split ring 80 is spaced from the inside surface of the female part 62.

FIG. 8b shows the position wherein the split ring has been pressed downwards in contact with the inside of the female part 62 simultaneously as the locking sleeve is pressing the split ring 80 outwards. FIG. 8c shows the situation when the split ring 80 has arrived into position just above a conically stepped inside of the female part, corresponding to the stepped outside of the split ring as shown.

FIG. 8d shows the position wherein the male part 60 has been pressed down into contact with the bottom of the female part, simultaneously as the seal ring 78 has arrived into contact with the adjacent inside surface of the male part. When the locking sleeve 20 now is pressed further downwards, the split ring 80 will be pressed radially outwards and be pressed into engagement with the inside of the female part subject to a wedge action, simultaneously as the ring seal 78 is subjected to high compression. The dimensions and the position of the split ring 80 with cooperating engagement faces on the outside of the split ring and the inside of the female part 62 and the packing seal 78, respectively, are such calibrated that the seal ring will determine the final position of the male part 60. In this fashion the seal 78 will be subject to a locked compression in the coupling.

A substantial advantage with the pipe coupling in accordance with the invention is that the entire coupling procedure can be carried out on the outside of a ready assembled coupling and that the coupling can be carried out by means of one single auxiliary power tool. In addition to a safe and quick coupling, release and disengagement of the coupling parts, the present invention makes it possible to intercouple two or several parallel pipe lines by means of a module assembly, wherein two or several pipes or the like with complementary pipe coupling are present.

Intercoupling two or several parallel pipe lines is very important in connection with subsea constructions, wherein the female parts are vertically mounted on a bottom frame and the male parts shall be coupled thereto. The male parts including the coupling implements can then be mounted on a modular frame, which thereafter are lowered down into position on a complementary module with female parts, whereafter the finalizing intercoupling takes place by means of a procedure which is illustrated in FIG. 7.

On the male part may in operational vicinity to the gear housing be arranged a skirt or funnel-shaped device, dimensioned to circumscribe the female part in the coupling. A such device may facilitate positioning and lowering of the male part into the below positioned female part, for instance an outwardly pointing well head or the like.

What is claimed is:

1. A socket pipe joint comprising:
    a male part and a female part telescopically and axially interconnected in the joint;
    locking elements for releasably locking said male part and said female part relative to one another including at least one elongated locking sleeve between the male part and the female part, said elongated locking sleeve being located on the male part and, in said joint, extending from a position within the female part to a position outside an end opening of said female part, said locking sleeve having a generally annular tapered surface; and
    a drive assembly positioned outside the joint mounted on the male part to displace said locking sleeve along said male part between locked and unlocked positions, said locking elements including at least one pawl having a transverse surface engageable by said tapered surface of said locking sleeve and a wedge surface engageable with a generally complementary surface on said female part, the transverse and wedge surfaces of said one pawl being cooperable with the tapered surface of said locking sleeve and said complementary surface of said female part, respectively, to position and lock the male part and female part to one another in response to displacement of said locking sleeve in one axial direction.

2. A socket pipe joint according to claim 1 wherein said locking sleeve includes drive surfaces engageable by said drive assembly mounted on the male part.

3. A socket pipe joint according to claim 1 wherein said drive assembly comprises a gear unit having a head for engagement by a rotary power tool.

4. A socket pipe joint according to claim 1 wherein said pawl comprises a plurality of circumferentially spaced, radially displaceable pawl members disposed between positions on the inside of said male part and complementary positions on the inside of the female part.

5. A socket pipe joint in accordance with claim 4 wherein an intersection of said locking sleeve is positioned on the inside of said pawls and responsive to displacement of said locking sleeve to displace the pawls outwardly into a biasing position on the inside of said female part whereby said male part and said female part interlock relative to one another.

6. A socket pipe joint according to claim 5 including a seal between an inner end part of said male part and an adjacent inside face of said female part for sealing said male part and said female part to one another.

7. A socket pipe joint according to claim 5 wherein said seal is subjected to compression by radially outwardly directed movement of said pawls when said pawls are in a biasing position between said male part and said female part, respectively, whereby said male part and said female part are interlocked to one another in the coupling affording compression of said seal.

8. A socket pipe joint according to claim 1 wherein said pawl comprises a continuous integral ring member of metal, said ring member being transversely split affording radial flexibility thereto.

9. A socket pipe joint according to claim 1 wherein each of said male part and said female part circumscribes two or more parallel tubular pipe lines in respective communication with one another, each of the communicating pipe lines being connected by a coupling joint mounted between the male part and female part comprised of a seal ring mounted in adjoining ends of the communicating pipe lines of the male and female parts, respectively, each said pipe line being intercoupled with simultaneous compression of each of said seal rings upon intercoupling the male part and the female part.

10. A socket pipe joint comprising:
a male part and a female part telescopically interconnected in the joint;
locking elements for releasably locking said male part and said female part relative to one another including at least one elongated locking sleeve between the male part and the female part, said elongated locking sleeve being located on the male part and, in said joint, extending from a position within the female part to a position outside an end opening of said female part;
a drive assembly positioned outside the joint mounted on the male part to displace said locking sleeve along said male part between locked and unlocked positions, said locking elements including at least one pawl cooperable between said male part, said female part and said locking sleeve to position and lock the male part and female part to one another;
said drive assembly including a ring gear circumscribing said male part and said locking sleeve, said ring gear provided with internal threads in engagement with threads on the locking sleeve, said ring gear lying in engagement with the gear drive.

11. A socket pipe joint comprising:
a male part and a female part telescopically interconnected in the joint;
locking elements for releasably locking said male part and said female part relative to one another including at least one elongated locking sleeve between the male part and the female part, said elongated locking sleeve being located on the male part and, in said joint, extending from a position within the female part to a position outside an end opening of said female part;
a drive assembly positioned outside the joint mounted on the male part to displace said locking sleeve along said male part between locked and unlocked positions, said locking elements including at least one pawl cooperable between said male part, said female part and said locking sleeve to position and lock the male part and female part to one another;
said locking sleeve being mounted for non-rotational displacement along said male part in an axial direction by a splint and groove cooperable between said male part and said locking sleeve.

12. A socket pipe joint comprising:
a male part and a female part telescopically interconnected in the joint;
locking elements for releasably locking said male part and said female part relative to one another including at least one elongated locking sleeve between the male part and the female part, said elongated locking sleeve being located on the male part and, in said joint, extending from a position within the female part to a position outside an end opening of said female part;
a drive assembly positioned outside the joint mounted on the male part to displace said locking sleeve along said male part between locked and unlocked positions, said locking elements including at least one pawl cooperable between said male part, said female part and said locking sleeve to position and lock the male part and female part to one another;
said pawl comprising a continuous integral ring member of metal, said ring member being transversely split affording radial flexibility thereto;
said split ring member being radially movably mounted on a support ring mounted at an inner end of said male part.

13. A socket pipe joint according to claim 12 wherein said support ring has transverse slits therein, said split ring member being mounted on the support ring by bolts having heads positioned in said transverse slits.

14. A socket pipe joint comprising:
a male part and a female part telescopically interconnected in the joint;
locking elements for releasably locking said male part and said female part relative to one another including at least one elongated locking sleeve between the male part and the female part, said elongated locking sleeve being located on the male part and, in said joint, extending from a position within the female part to a position outside an end opening of said female part;
a drive assembly positioned outside the joint mounted on the male part to displace said locking sleeve along said male part between locked and unlocked positions, said locking elements including at least one pawl cooperable between said male part, said female part and said locking sleeve to position and lock the male part and female part to one another;

said pawl comprising a continuous integral ring member of metal, said ring member being transversely split affording radial flexibility thereto;

said split ring member including ring-shaped steps with oblique surfaces along outer surfaces thereof and mating complementary steps on the inside of the adjacent female part, enabling inward displacement of said locking sleeve to clamp said split ring member against said female part by a wedging action simultaneously as said seal is placed in compression by axial movement of said male part against said seal.

* * * * *